US006814878B2

(12) United States Patent
Tully

(10) Patent No.: US 6,814,878 B2
(45) Date of Patent: Nov. 9, 2004

(54) PROCESS FOR CARRYING OUT A HYDROGENATION REACTION AND REMOVING PYROPHORIC CATALYST

(75) Inventor: William Tully, Midleton (IE)

(73) Assignee: Pfizer Science and Technology Ireland Limited, County Dublin (IE)

(*) Notice: Subject to any disclaimer, the term of this patent is extended or adjusted under 35 U.S.C. 154(b) by 0 days.

(21) Appl. No.: 10/452,638

(22) Filed: Jun. 2, 2003

(65) Prior Publication Data

US 2003/0196951 A1 Oct. 23, 2003

Related U.S. Application Data

(63) Continuation of application No. 10/172,058, filed on Jun. 14, 2002, which is a continuation of application No. PCT/IE00/00156, filed on Dec. 18, 2000.

(30) Foreign Application Priority Data

Dec. 17, 1999 (IE) .................................. PCT/IE99/00137

(51) Int. Cl.[7] .......................... B01D 29/27; B01D 29/96; B01J 8/00; B01J 25/02; B01J 25/04
(52) U.S. Cl. ....................... 210/772; 210/800; 210/804; 502/21; 502/22; 502/54; 422/131; 422/187; 422/232; 422/239
(58) Field of Search ................................ 210/241, 451, 210/452, 455, 477, 478, 479, 480, 511

(56) References Cited

U.S. PATENT DOCUMENTS

| 4,021,354 | A | | 5/1977 | Lyon |
| 4,182,919 | A | | 1/1980 | Mabuchi et al. |
| 4,664,798 | A | * | 5/1987 | Bergh .......................... 210/241 |
| 5,690,836 | A | | 11/1997 | Raskin et al. |
| 5,840,188 | A | * | 11/1998 | Kirsgalvis ................... 210/448 |

FOREIGN PATENT DOCUMENTS

| DE | 26 27 725 | | 1/1977 |
| DE | 31 36905 | A1 | 3/1983 |
| DE | 43 25 682 | A1 | 2/1994 |
| EP | 0 605 363 | B1 | 6/1996 |
| WO | WO01/43863 | A1 | 6/2001 |

OTHER PUBLICATIONS

PCT International Search Report for PCT/IE00/00156.
PCT International Search Report for PCT/IE00/155.
* cited by examiner Primary Examiner—John Kim
(74) Attorney, Agent, or Firm—Francis J. Tinney

(57) ABSTRACT

A batch process for carrying out a hydrogenation reaction comprises mixing a pyrophoric catalyst with reactants and solvents to form a reaction mixture in a reaction vessel. Hydrogen is added to the reaction vessel. After hydrogenation, the desired hydrogenation product is removed from the reaction vessel and the pyrophoric catalyst-rich material from the reaction vessel is delivered to a pressure filter. Water is added to the pyrophoric catalyst-rich material in the filter and the spent pyrophoric material is removed from the pressure filter in a water wet form.

6 Claims, 6 Drawing Sheets

PROCESS FOR CARRYING OUT A HYDROGENATION REACTION AND REMOVING PYROPHORIC CATALYST

RELATED APPLICATIONS

This application is a continuation application of U.S. Ser. No. 10/172,058, filed Jun. 14, 2002, now pending, which is a continuation of PCT/IE00/00156, filed Dec. 18, 2000, which claims benefit of PCT/IE99/00137, filed Dec. 17, 1999, all of which are incorporated herein by reference in their entirety.

FIELD OF THE INVENTION

The invention relates to a factory scale apparatus for carrying out a hydrogenation reaction.

BACKGROUND OF THE INVENTION

Hydrogenation reactions are frequently carried out in the presence of a pyrophoric catalyst such as Raney nickel. This presents a serious difficulty because flammable liquids such as methanol or ethanol are often used as hydrogenation solvents. The removal of the catalyst from the reaction mixture after the hydrogenation reaction is complete, presents serious difficulties. Generally the reaction mixture is passed through a filter, the catalyst is filtered out and removed in a closed circuit.

Handling of the resultant catalyst presents difficulties and the commonly used multiplate filters, which necessitate generation of hazardous dry material, require extensive safety precautions, and extended operation times to facilitate safe removal of the catalyst.

U.S. Pat. No. 4,021,354 describes a pressure filter comprising an outer casing having a filter basket supported therein. The filter basket comprises a tubular imperforate metallic shell with a sintered stainless steel filter disc welded to the lower end of the shell. Such a pressure filter is not suitable for use with fine metallic catalyst as the sintered disc readily clogs during operation. Removal of catalyst from the pores requires reverse flow of water and frequent use of acid to dissolve trapped material.

DE-A-3136905 describes a pressure filter including a sieve basket of the same type as that described in U.S. Pat. No. 4,021,354 and similar disadvantages apply.

There is therefore a need for an improved cost effective filter apparatus for removing a pyrophoric catalyst which will overcome these problems.

SUMMARY OF THE INVENTION

According to the invention there is provided a filter apparatus for recovery of spent hydrogenation catalyst-rich material, the apparatus comprising:

(a) a pressure filter container;

(b) the container having a filter plate mounted therein on which pyrophoric catalyst-rich material is filtered;

(c) the container having a catalyst inlet for pyrophoric catalyst-rich material to be filtered and an inlet for delivery of solvent or water to wash the spent catalyst on the filter plate; and (d) a filter bag of solvent/water permeable material mounted in the container and supported on the filter plate for collection of filtered spent pyrophoric catalyst material in a water-wet form.

In a preferred embodiment the filter bag is of flexible material allowing easy fitting and removal from the filter. The bag can be folded into a compact size for disposal when required. Ideally the bag is of multifilament woven material. This ensures a large multilayer filter surface area which is not prone to blockage.

In a particularly preferred embodiment of the invention the bag is of acid resistant polypropylene multifilament weave. Thus if blockages occur the filter can be reversed and flushed with high pressure water and if necessary soaked in dilute HCl acid. Alternatively, the bags may be replaced at a predetermined frequency.

In one embodiment the filter bag is releasably mounted to the container. Preferably the filter apparatus includes releasable mounting means for tightening and demounting the filter bag from the container. The bag may be fitted with sewn lifting straps and removed by hoist into drums for off-site recovery of catalyst.

The filter container is preferably mounted on a transportable chassis. Preferably the chassis is a wheeled chassis.

The apparatus may be used in a batch process for carrying out a hydrogenation reaction comprising the steps of:

(a) mixing a pyrophoric catalyst with reactants and solvents to form a reaction mixture in a reaction vessel;

(b) adding hydrogen to the reaction vessel;

(c) after hydrogenation, removing the desired hydrogenation product from the reaction vessel;

(d) delivering the pyrophoric catalyst-rich material from the reaction vessel to a pressure filter;

(e) adding water to the pyrophoric catalyst-rich material in the filter; and (f) removing the spent pyrophoric material from the pressure filter in a water wet form.

In a preferred embodiment of the invention the pressure filter is a single plate pressure filter, the catalyst being held in the filter in a water wet form.

In one embodiment the catalyst is Raney nickel.

Preferably the contents of the reaction vessel are decanted after hydrogenation, the desired hydrogenation product being substantially removed while allowing the catalyst-rich material to settle at the bottom of the vessel.

Preferably the reaction vessel is an agitated vessel, the agitator being stopped to allow the catalyst to settle at the bottom of the vessel.

In one embodiment of the invention the process includes the step of washing the catalyst-rich material in the filter with a solvent to recover residual desired hydrogenation product.

The pressure filter may be fitted with a removable filter bag and in this case the water wet catalyst is preferably removed from the bag and the bag is reusable. Alternatively the bag containing the catalyst is removed and sent for catalyst recovery.

DESCRIPTION OF THE DRAWINGS

The invention will be more clearly understood from the following description given by way of example only with reference to the accompanying drawings in which.

DETAILED DESCRIPTION OF THE INVENTION

Figure 1:
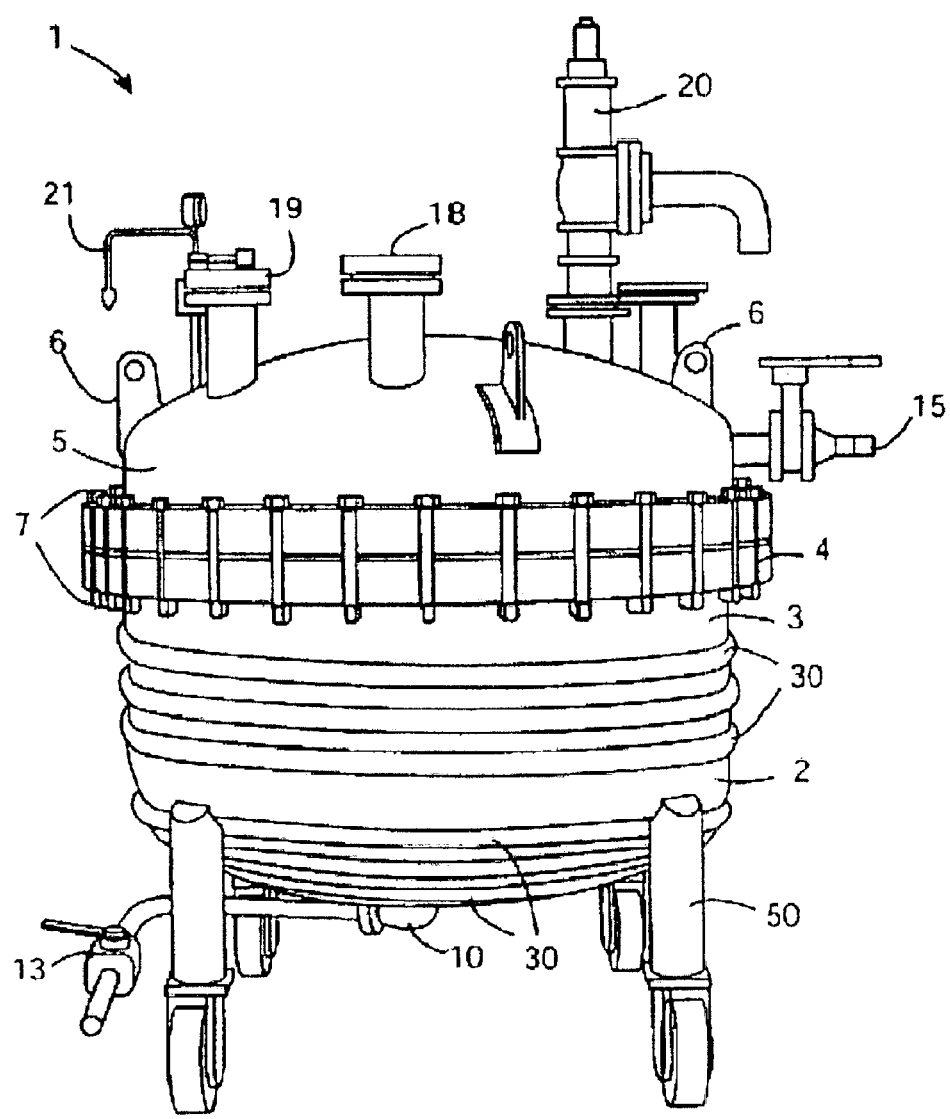
FIG. 1 is a perspective view from the front of a filter apparatus of the invention.
Figure 2:
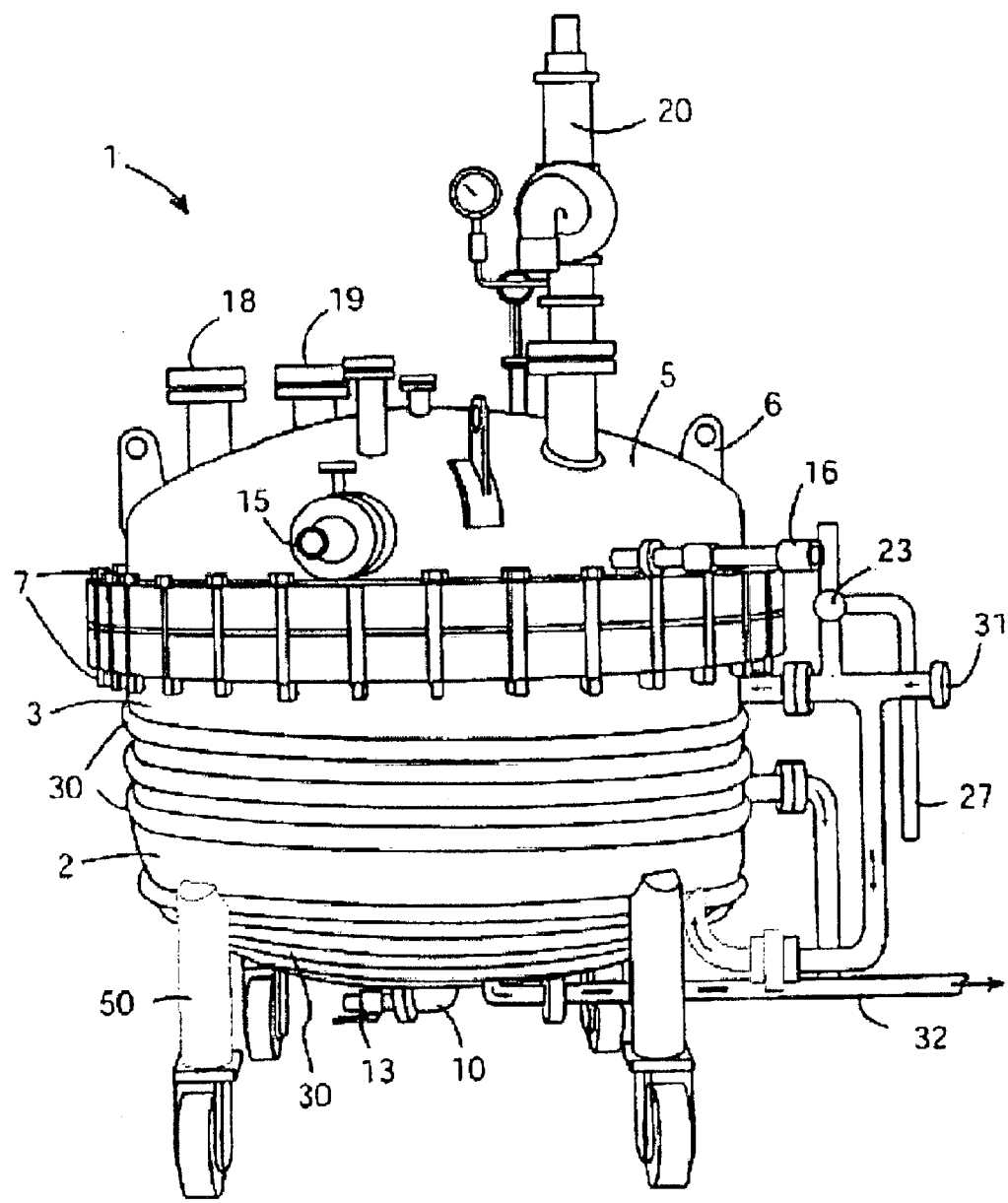
FIG. 2 is a perspective view from the side of the filter apparatus of FIG. 1.

The invention will be more clearly understood from the following description given by way of example only.

The invention utilizes a process wherein, after hydrogenation, a reaction mixture is decanted, the desired hydrogenation product is substantially removed and catalyst-rich material which settles at the bottom of the vessel is delivered to a single plate pressure filter. The spent catalyst is retained in the filter bag while the product rich solvent is led away from the bottom outlet of the pressure filter to a receiving vessel. The retained catalyst material is washed with a solvent to recover residual product and then washed with water to saturate the catalyst material which is then safely and easily transferred to drums and stored under water awaiting recovery.

Referring to FIGS. 1 to 5 there is illustrated a filter apparatus 1 of the invention. The filter apparatus 1 comprises a container having a domed base 2, a generally cylindrical sidewall 3 terminating in an upper rim 4 closed by a removable lid 5 having lifting lugs 6. The lid 5 is fixed in pressure-tight engagement with the sidewall 3 by flange engaging screw clamps 7 and an embedded polytetrafluoroethene gasket 8.

The filter container has a single removable, perforated filter plate 9 which is supported in spaced-apart relation from the base 2 by supports 12. The base 2 has an outlet 10 below the filter plate 9. The outlet 10 is fitted with an outlet valve 13 for discharge of product-rich solvent.

The lid 5 has several fittings including a main catalyst inlet line 15, a decant inlet valve 16, and a water wash inlet line 17. A light port 18, a sight glass 19, pressure relief line 20, and a nitrogen purge line 21 are also provided. An earth clip 22 is located on the lid 5.

The filter container has two jacketed coils 30 with inlet and outlets 31, 32. The jackets may be heated or cooled, as required, to heat or cool the contents of the filter container. A hot water pressure release device 23 and a hot water overflow 27 are also provided.

Figure 3A:
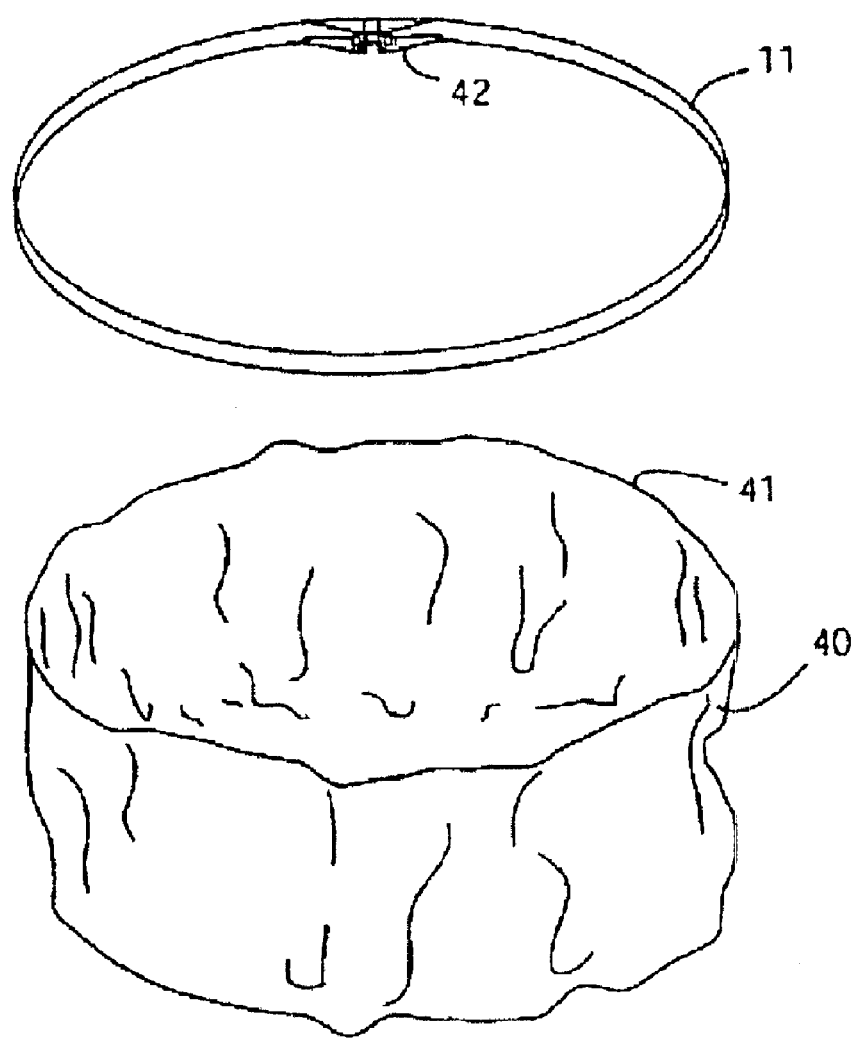
FIG. 3A is an exploded perspective view of a removable filter bag and associated clamping band.
Figure 3B:
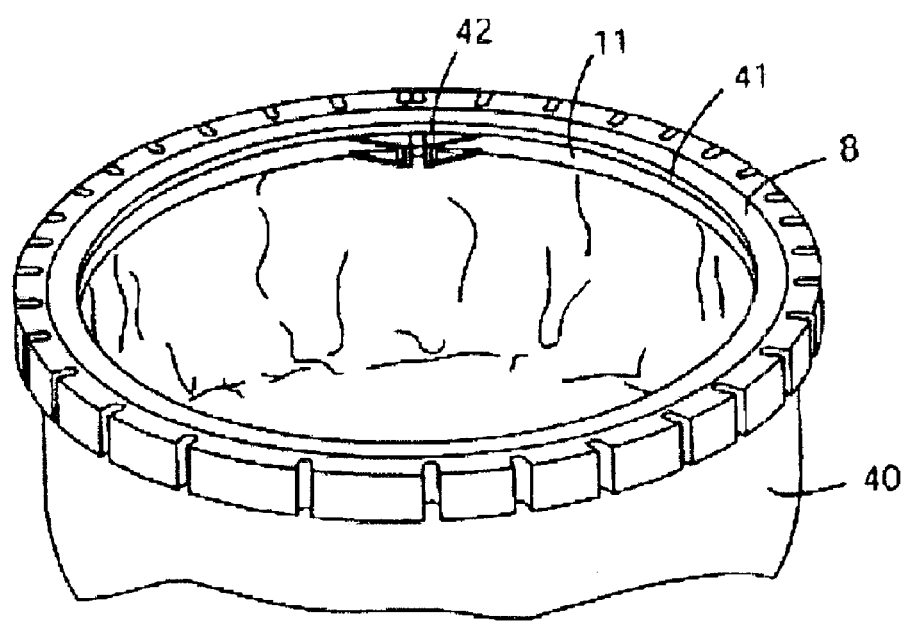
FIG. 3B is a perspective view of the filter bag in position.
Figure 4:
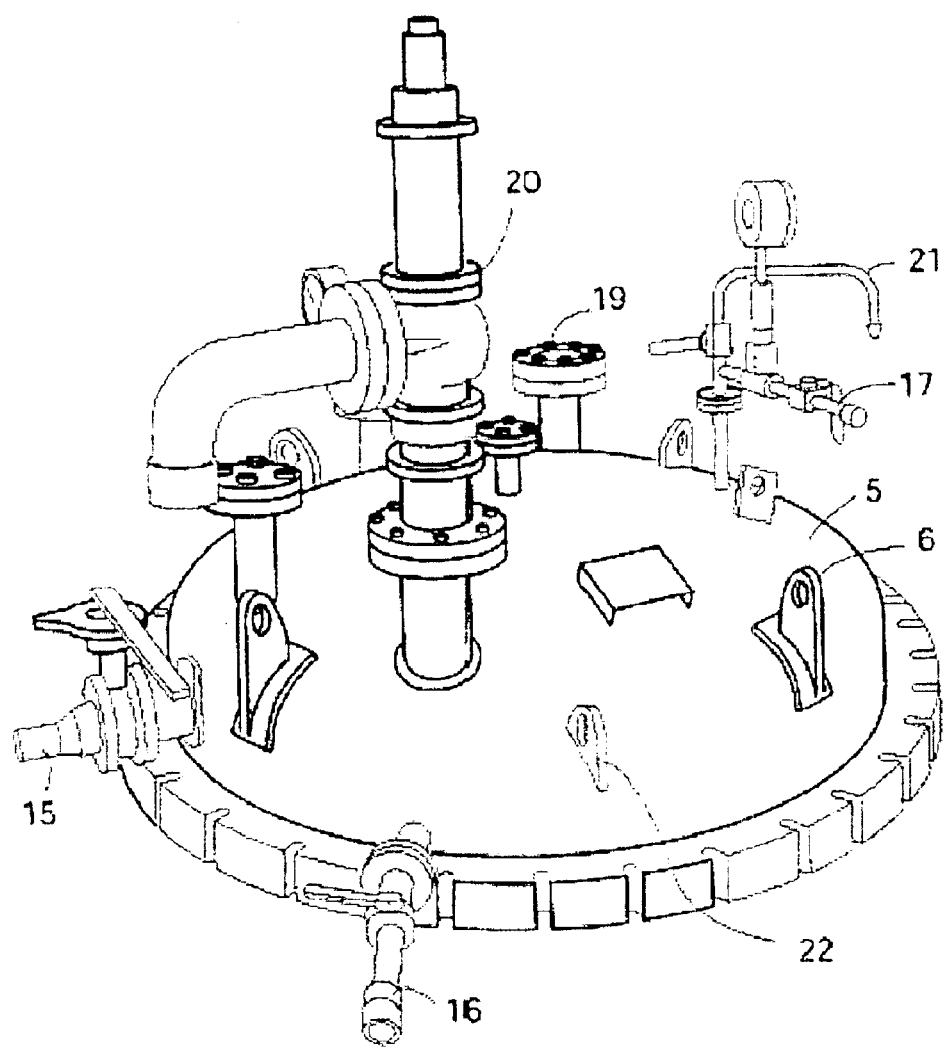
FIG. 4 is a top view of a clam-shell lid of the filter apparatus of FIG. 1.
Figure 5:
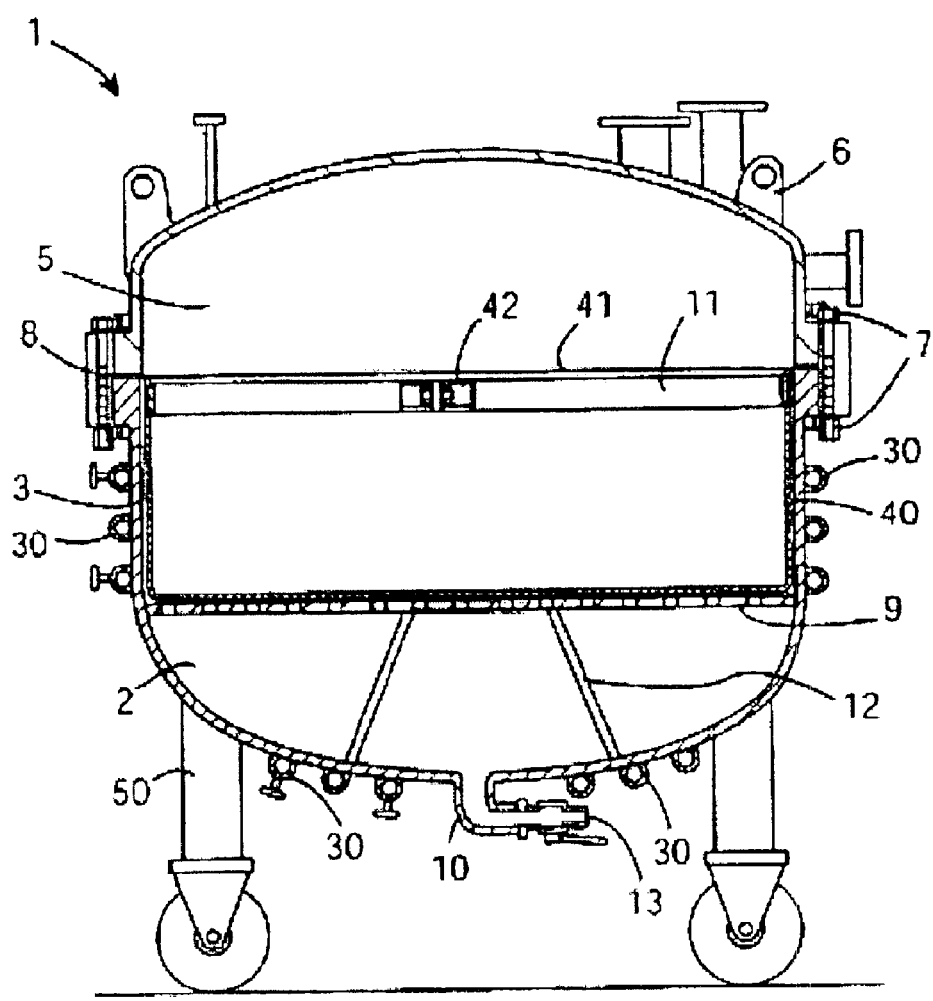
FIG. 5 is a cross-sectional view of the filter apparatus of the invention.

Referring especially to FIG. 3 there is illustrated a removable filter bag 40 of water/solvent permeable material, typically of acid resistant polypropylene weave (about 10-micron pores), with a top rim 41 held in position against the side wall 3 of the filter container by a band 11. A releasable ring clamp 42 is provided on the band 11. The clamp 42 is adjustable to maximize the diameter of band 11 and thus tighten the filter bag rim 41 against the filter side wall 3. The bottom of the filter bag 40 rests on a perforated filter plate 9 which is supported by a filter plate support 12. The filter is inerted by first applying a vacuum and then breaking the vacuum with nitrogen. Most of the contents of a reaction vessel after settling are pressure decanted from the reaction vessel and fed into the closed single plate pressure filter apparatus 1 through an inlet line 16. Liquid free of catalyst is discharged through the bottom outlet valve 13 and transferred to a receiving vessel. The residual catalyst in the reaction vessel is fed to the filter through the larger inlet line 15 followed by a solvent wash to recover residual product. The spent catalyst is retained in a filter bag 40 while the desired product is drained off and removed, by applying pressure to the apparatus 1, through to a receiving vessel via the outlet valve 13. Water is then added through the wash inlet line 17 to wash out residual solvent to waste and to saturate the retained catalyst material. The pressure in the filter apparatus 1 is released and the lid 5 is removed by passing a chain through the lugs 6 and hoisting the lid 5 off. Water saturated catalyst is scooped directly to drums and stored under water. Alternatively the filter bag 40 is lifted out and the water wet catalyst is removed and stored for disposal. The filter bag 40 may be reused. Alternatively the filter bag 40 is lifted out of the pressure filter and the bag containing catalyst charged to a drum where it is stored under water and sent for catalyst recovery.

The filter container is mounted on a wheeled chassis 50 so that the filter apparatus may be easily moved from one location to another.

The invention provides a simple, cheap and rapid method for removing spent pyrophoric catalyst from hydrogenation catalyst-rich material. The filter apparatus is cheap to set up and maintain. By keeping the pyrophoric catalyst water wet the catalyst does not pose a safety hazard and may be easily taken from the filter apparatus 1 in removable filter bags 40 and safely and easily transferred to drums containing water for storage and recovery. The filter surface area is readily cleaned and reused or alternatively is disposable.

The invention is not limited to the embodiments hereinbefore described which may be varied in detail.

What is claimed is:

1. A batch process for carrying out a hydrogenation reaction comprising the steps of:

(a) providing a reaction vessel;

(b) mixing a pyrophoric catalyst with reactants and solvents to form a reaction mixture in the reaction vessel;

(c) adding hydrogen to the reaction vessel;

(d) after hydrogenation, removing the desired hydrogenation product from the reaction vessel and retaining pyrophoric catalyst-rich material in the vessel;

(e) providing a pressure filter comprising a container having an upper rim closable by a removable lid, the lid having a main inlet for pyrophoric catalyst-rich material;

(f) mounting a removable filter bag in the container;

(g) closing the lid;

(h) delivering the pyrophoric catalyst-rich material from the reaction vessel through the main inlet to the removable filter bag;

(i) adding water to the pyrophoric catalyst-rich material in the filter bag to saturate the pyrophoric catalyst-rich material in the filter bag;

(j) opening the lid of the pressure filter; and (k) removing the filter bag containing the spent pyrophoric catalyst-rich material from the pressure filter in a water wet form.

2. A process as claimed in claim 1 comprising washing the catalyst-rich material in the filter bag with a solvent to recover residual desired hydrogenation product.

3. A process as claimed in claim 1 wherein the pressure filter is a single plate pressure filter, and the process comprises holding the catalyst in the filter in a water wet form.

4. A process as claimed in claim 1 wherein the catalyst is Raney Nickel.

5. A process as claimed in claim 1 comprising decanting the contents of the reaction vessel after hydrogenation, the desired hydrogenation product being substantially removed while allowing the catalyst-rich material to settle in the bottom of the vessel.

6. A process as claimed in claim 1 wherein the reaction vessel has an agitator and the process comprises the step of stopping the agitator to allow the catalyst to settle at the bottom of the vessel.

* * * * *